United States Patent
Bray et al.

(10) Patent No.: US 12,481,062 B2
(45) Date of Patent: *Nov. 25, 2025

(54) ACTIVE MODULATING ELEMENT DETECTION

(71) Applicant: BAE SYSTEMS plc, London (GB)

(72) Inventors: Mark Edgar Bray, Chelmsford (GB); Jason John Lepley, Chelmsford (GB)

(73) Assignee: BAE SYSTEMS PLC, London (GB)

( * ) Notice: Subject to any disclaimer, the term of this patent is extended or adjusted under 35 U.S.C. 154(b) by 946 days.

This patent is subject to a terminal disclaimer.

(21) Appl. No.: 17/753,265

(22) PCT Filed: Aug. 20, 2020

(86) PCT No.: PCT/GB2020/051996
§ 371 (c)(1),
(2) Date: Feb. 25, 2022

(87) PCT Pub. No.: WO2021/038199
PCT Pub. Date: Mar. 4, 2021

(65) Prior Publication Data
US 2022/0299642 A1   Sep. 22, 2022

(30) Foreign Application Priority Data

Aug. 28, 2019  (GB) ....................... 1912327
Oct. 28, 2019  (EP) ..................... 19275106

(51) Int. Cl.
*G01S 17/08*   (2006.01)
*G01H 9/00*   (2006.01)
(Continued)

(52) U.S. Cl.
CPC .............. *G01S 17/50* (2013.01); *G01H 9/00* (2013.01); *G01S 17/08* (2013.01); *H04N 23/56* (2023.01); *H04N 23/957* (2023.01)

(58) Field of Classification Search
CPC .......... G01S 17/50; G01S 17/08; G01S 17/04; G01H 9/00; H04N 5/2256; H04N 5/22541; H04N 23/56; H04N 23/957
(Continued)

(56) References Cited

U.S. PATENT DOCUMENTS 3,610,891 A   10/1971  Raciazek
5,264,916 A   11/1993  Bushman
(Continued)

FOREIGN PATENT DOCUMENTS

EP   3139195 B1 *  4/2022  ............ G01H 13/00
GB   2213931 A      8/1989
(Continued)

OTHER PUBLICATIONS

Wikipedia, "Stroboscopic effect," 2025, 10 pages. (Year: 2025).*
(Continued)

*Primary Examiner* — Daniel L Murphy
(74) *Attorney, Agent, or Firm* — Finch & Maloney PLLC (57) ABSTRACT

Methods and apparatus for detecting a modulating element of an object in a scene are described in which an element in a scene is illuminated with a modulated light source. A signal is obtained from an optical detector based on light received from the illuminated element. An intermediate frequency signal is detected from the signal obtained from the optical detector, the intermediate frequency signal being related to a frequency of the modulated light source and a frequency of modulation of the element within the scene. The modulating element is detected based on the intermediate frequency signal.

20 Claims, 6 Drawing Sheets

(51) Int. Cl.
*G01S 17/50* (2006.01)
*H01H 9/00* (2006.01)
*H04N 23/56* (2023.01)
*H04N 23/957* (2023.01)

(58) Field of Classification Search
USPC .................................................. 356/28
See application file for complete search history.

(56) References Cited

U.S. PATENT DOCUMENTS

| | | | |
|---|---|---|---|
| 5,341,435 A | 8/1994 | Corbett et al. | |
| 5,376,940 A | 12/1994 | Abatzoglou | |
| 5,999,652 A | 12/1999 | Bushman | |
| 6,728,645 B1 * | 4/2004 | Kozlov | G01H 13/00 |
| | | | 702/56 |
| 7,193,720 B2 | 3/2007 | Gatt | |
| 7,551,519 B2 | 6/2009 | Slater | |
| 8,144,334 B2 * | 3/2012 | Chinn | G01H 9/004 |
| | | | 356/482 |
| 9,412,269 B2 | 8/2016 | Saptharishi et al. | |
| 9,726,761 B2 * | 8/2017 | Halmos | G01S 17/58 |
| 10,156,473 B2 * | 12/2018 | Lam | G01S 7/4812 |
| 10,298,813 B2 | 5/2019 | Sprigg et al. | |
| 10,403,107 B2 | 9/2019 | Hill et al. | |
| 10,728,436 B2 | 7/2020 | Piekniewski et al. | |
| 11,209,517 B2 | 12/2021 | Yachida | |
| 2007/0166049 A1 | 7/2007 | Pearson et al. | |
| 2008/0084539 A1 | 4/2008 | Daniel | |
| 2018/0012461 A1 | 1/2018 | Hill et al. | |
| 2018/0012561 A1 | 1/2018 | Yoon et al. | |
| 2018/0273208 A1 | 9/2018 | Ismail | |
| 2019/0180077 A1 | 6/2019 | Zhou et al. | |
| 2022/0299612 A1 | 9/2022 | Bray et al. | |

FOREIGN PATENT DOCUMENTS

| | | | | |
|---|---|---|---|---|
| GB | 2562829 A | | 11/2018 | |
| WO | WO-0114825 A1 | * | 3/2001 | ............ G01H 9/00 |
| WO | 2013108253 A1 | | 7/2013 | |
| WO | 2017207716 A1 | | 12/2017 | |
| WO | 2021038191 A1 | | 3/2021 | |
| WO | 2021038199 A1 | | 3/2021 | |

OTHER PUBLICATIONS

International Preliminary Report on Patentability received for PCT/GB2020/051931, mail date: Mar. 10, 2022. 10 pages.
International Preliminary Report on Patentability received for PCT/GB2020/051996, mail date: Mar. 10, 2022. 9 pages.
International Search Report and Written Opinion received for PCT Application No. PCT/GB2020/051931. Mail date: Nov. 16, 2020. 16 pages.
GB Search Report under Section 17(5) received for GB Application No. 1912326.4, dated Feb. 12, 2020. 5 pages.
Extended European Search Report received for EP Application No. 19205694.3, dated Mar. 4, 2020. 8 pages.
International Search Report and Written Opinion received for PCT Application No. PCT/GB2020/051996. Mail date: Nov. 12, 2020. 14 pages.
GB Search Report under Section 17(5) received for GB Application No. 1912327.2, dated Feb. 12, 2020. 3 pages.
Extended European Search Report received for EP Application No. 19275106.3 dated Apr. 15, 2020. 8 pages.

* cited by examiner

ACTIVE MODULATING ELEMENT DETECTION

TECHNICAL FIELD

The present application relates to methods and apparatus of optical detection of an object. In particular, but not exclusively, it relates to active optical detection of a modulating element of an object in which the element is illuminated.

BACKGROUND

The low cost and availability of unmanned aerial vehicles (UAVs) or drones makes them a useful tool for criminals and military adversaries. They may be used as surveillance assets or as a means of transporting a payload. As an example, criminals are known to use drones to smuggle illegal drugs or contraband mobile phones over prison walls. Drones may also be used to carry explosives, chemical weapons, or other weapon payloads, or simply to disrupt activities in crowded stadiums, airports, flight paths, military bases, and other restricted areas. For example, in one recent incident a drone was used maliciously to disrupt an airport by flying near the airport runway which led to the grounding of planes while it was not known if the drone remained in the vicinity.

Drone detection has proven difficult, particularly because they have a small visual cross-section, and may not provide a significant thermal, acoustic, or RF signature to enable their detection, particularly when the field of regard of the sensor attempting to detect the drone may be considerable. For example, the region in and around an airport, including the flight path of the airplanes, may extend to many tens of square kilometres in area and a significant distance vertically.

Vision based systems can recognise drones from their shape if the drone is sufficiently large on the image. This requires a high acuity sensor, often combined with a long focal length lens, to detect the drone at any substantial range. The ability to cover wide areas of sky from such an optical system is limited.

Radar, similarly, suffers from the same problem in that it requires a sufficient response from an interrogated drone for it to be detected. The composition of many drones is predominantly plastic with little in the way of metallic content, this ensures they are lightweight for power efficiency, but provides for a poor radar signature.

RF detection of the transmitter may be used, for example where the drone is being controlled using RF means. The range of RF may be greater than for visual means, and will not be obscured by cloud or poor weather conditions. Detecting the RF signature is difficult in RF cluttered environments and it is even more difficult to locate the object with any accuracy. Obtaining direction requires a large antenna baseline and significant processing, making the equipment cumbersome and expensive.

Acoustic detection means are unsuitable at any substantial range, and sensitivity falls rapidly in the presence of other acoustic clutter such as road traffic noise. Spatial resolution is also limited by the sound wavelength.

SUMMARY

In an aspect, there is provided a method for detecting a modulating element of an object in a scene, comprising: illuminating an element in a scene with a modulated light source; obtaining a signal from an optical detector based on light received from the illuminated element; detecting an intermediate frequency signal from the signal obtained from the optical detector, the intermediate frequency signal being related to a frequency of the modulated light source and a frequency of modulation of the element within the scene; detecting the modulating element based on the intermediate frequency signal. The intermediate frequency signal may be a signal at a difference frequency between the modulated light source and the modulating element.

For example, the rotation of a propeller blade that has a different contrast, colour, or temperature to the object behind it, will result in the pixels or detector that capture the propeller exhibiting a time dependent variation in intensity (or colour or temperature). When illuminated with a modulated source, a modulated object, such as a propeller, will undergo a strobing effect, such that the combined modulations of the object and the illumination source result in an observable frequency component that is related to the two frequencies. An optical detector viewing the object will detect this intermediate (difference) frequency between the illuminator frequency and the frequency of the modulating object.

When the object is actively illuminated using a modulated source, the sensor need only be sensitive to the intermediate (difference) frequency between the source and the object. The source modulating frequency can be chosen to ensure that the difference frequency lies within a preferred bandwidth of the receiving detector. This may be at zero-frequency (i.e., where the source frequency matches the frequency of the object), or at another preferred frequency where the detector is sensitive, e.g., less than a digital camera's frame rate.

Embodiments of the present invention are, therefore able to detect objects that themselves are modulating at frequencies that may be significantly higher than those that might be detectable using the passive means.

If the modulating light source were not to be used, and a detector is operating continuously, the maximum frequency of the modulating object (e.g., UAV rotor) that could be detected will be limited by the upper frequency bandwidth of the detector. In the case where the detector is an imaging device (e.g., a conventional imaging device having an image sensor), the maximum frequency of the modulating object that can be detected will be limited by the pixel stare time and the frame rate of the imager.

Further, when the frequency of the modulating object exceeds half the frame rate of the imager (i.e., the Nyquist limit) the resulting detected frequency will suffer from the effects of aliasing. This in itself may not prevent its operation in detecting the modulating signal, but it will reduce the ability to accurately determine the frequency of the modulating object. The detection of the frequency may be useful to classify the object. Different categories of UAVs may have different propeller RPMs, for example, and may therefore have different signature signal frequencies.

Where light levels are low it may further be necessary to increase the stare time of the detector. When the stare time becomes long relative to the time period of the modulating object (as imparted on the optical sensor) the amplitude of the detected frequency component drops, reducing the detectable frequency signal. By using an illumination source (light emitting means), we are able to detect objects in low or zero lighting conditions, where the object would either not be visible or the received signal will be severely impaired by noise. Also, by increasing the illumination power, the stare time may be reduced, increasing the modulation depth.

The intermediate frequency signal may include filtering the signal obtained from the optical detector. This allows the intermediate frequency signal to be discriminated from other frequency components in the obtained signal and also reduces noise, thus increasing the probability of detection of the modulating element The filtering may be adaptive filtering arranged to adapt the bandwidth of the filter based on the detected intermediate frequency signal. This allows the bandwidth of the filter to be reduced and thereby potentially improve the signal to noise ratio and, thus, the probability of detection of the modulating element.

The frequency of the modulated light source may be selected so that the intermediate frequency lies within a preferred bandwidth. The preferred bandwidth may be a bandwidth of the optical detector. This is advantageous as it allows the method (or apparatus) to be configured such that the intermediate frequency is more likely to be detectable.

The optical detector may be an image sensor of a camera and the preferred bandwidth selected so as to not exceed a frame rate of the camera. The preferred bandwidth selected may also take into account a frame stare time (i.e., of the image sensor) The returning signal (pulse) needs to be received when the camera shutter is open, therefore, phase is also important (unless the intermediate frequency is zero, as the phase will then be fixed for successive pulses relative to the shutter). Again, this makes it possible to configure the detector so as to operate within the limits of the sensor employed.

In an embodiment, the method further includes detecting a time-shifted signal having the frequency of the modulated light source from the obtained signal; and comparing the detected time-shifted signal with the signal of the modulated light source to determine a distance from the light source to the modulating element.

By comparing the time delay between the illumination pulse and the received signal it is possible to determine the range of the object from the detector as the differential between the transmitted and received signals relates to the time of flight. This could also be achieved with the intermediate frequency provided the received signals can be associated with the transmitted signals from the illumination means.

The optical detector may comprise a non-imaging optical detector which is operable to operate in a continuous detection mode. Continuous detection can potentially detect modulating frequencies over a much wider bandwidth than an imaging sensor, which will be limited by effects including pixel stare time and the frame rate, for example.

Detecting, the modulating element includes determining a position of the modulating element based on the intermediate frequency signal. Thus, the position of the modulating object within the image in combination with the attitude of the imager can be used to determine the direction of the object from the detector.

The method may further comprise tracking the modulating element based on the detected position. This can be used to guide other apparatus such as targeting or guidance systems with or without a military application.

The modulating frequency of the light source may be swept, e.g., across a predetermined range.

A modulation frequency of the modulating element may be determined based on a frequency of the sweep at which the modulating element is detected. Accordingly, the frequency may be swept until the intermediate (difference) frequency falls within a detectable range of the detector.

In an aspect of the invention, there is provided apparatus for detecting a modulating element of an object in a scene, comprising a light source for illuminating an element in a scene with modulated light, an optical detector for obtaining a signal based on light received from the illuminated element, signal processing means for detecting an intermediate frequency signal from the signal obtained from the optical detector, the intermediate frequency signal being related to a frequency of the modulated light source and a frequency of modulation of the element within the scene, and modulating element detecting means for detecting the modulating element based on the intermediate frequency signal.

The intermediate frequency signal may be a signal at a difference frequency between the modulated light and the modulating element.

The signal processing means may be arranged so that detecting the intermediate frequency signal includes filtering the signal obtained from the optical detector. The filtering may be adaptive filtering arranged to adapt the bandwidth of the filter based on the detected intermediate frequency signal.

The light source may be arranged so that the frequency of the modulated light is such that the difference frequency lies within a preferred bandwidth. The preferred bandwidth may be a bandwidth of the optical detector and may include electronics associated with the optical detector.

The optical detector may comprise an image sensor of a camera and the preferred bandwidth selected to not exceed a frame rate of the camera. The preferred bandwidth (may be selected so that it) takes into account a frame stare time. The returning signal (pulse) needs to be received when the camera shutter is open, therefore, phase is also important (unless the intermediate frequency is zero, as the phase will then be fixed for successive pulses relative to the shutter).

The apparatus may further comprise means for detecting a time-shifted signal having the frequency of the modulated light source from the obtained signal, and means for comparing the detected time-shifted signal with the signal of the modulated light source to determine a distance from the light source to the modulating element.

The optical detector may comprise a non-imaging optical detector which is operable to operate in a continuous detection mode.

Detecting the modulating element (by the modulating element detection means) may include determining a position of the modulating element based on the intermediate frequency signal.

The apparatus may further comprise tracking means for tracking the modulating element based on the detected position.

The apparatus may further comprise means for sweeping the modulating frequency of the light source. The apparatus may include means for determining a modulation frequency of the detected modulating element based on a frequency of the sweep at which the modulating element is detected.

The modulating element may be one or more of: a rotor of a UAV or other vehicle, an emission from a vehicle exhaust, and a portion of a human face. The invention is not limited to these examples, however, and may be applicable to other modulating things such as the steady rotation of a wheel or breathing.

In another aspect of the invention, there is provided a computer program which upon execution causes a method according to any of the embodiments to be performed. For example, the program could be executed on a processor controlling a system or apparatus including an illuminator, and an optical detector and signal processing performed digitally at the suitably programmed processor.

In another aspect of the invention, there is provided a non-transitory computer-readable medium storing such a computer program wherein the computer program includes instructions executable by one or more processors and a memory.

The computer program may be embodied on a computer-readable or machine-readable carrier medium, the carrier medium may be transitory or non-transitory. For example, the carrier may be a signal modulated to carry data indicative of computer program code.

Alternatively, the carrier may be a storage medium such as a computer readable disk or memory stick. In an example, a device is provided having one or more processors and a memory, wherein the memory contains processor executable code which upon execution by the one or more processors causes any of the example methods above to be performed. The device may comprise electronic circuitry, for example, an ASIC or a configurable logic circuit (e.g., an FPGA) which embodies the one or more processors and a memory.

BRIEF DESCRIPTION OF THE DRAWINGS

Embodiments will now be described, by way of example only, with reference to the accompanying drawings, in which.

DESCRIPTION

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

The rotation of a propeller that has a different contrast, colour, or temperature to the object behind it, will result in the pixels that capture the propeller exhibiting a time dependent variation in intensity (or colour or temperature). This modulation will be a compound effect of the rotational speed of the propeller, the frame update rate, the pixel stare time, and in some cases occlusion, e.g., by structural elements of a UAV. When an object is actively illuminated using a modulating source the object will undergo a strobing effecting, such that the combined modulations of the object and the illumination source result in an observable frequency component that is related to the two frequencies. As will be explained further below, an optical detector may be arranged to detect this intermediate (difference) frequency between the illuminator frequency and the frequency of the modulating element (of an object).

Figure 1:
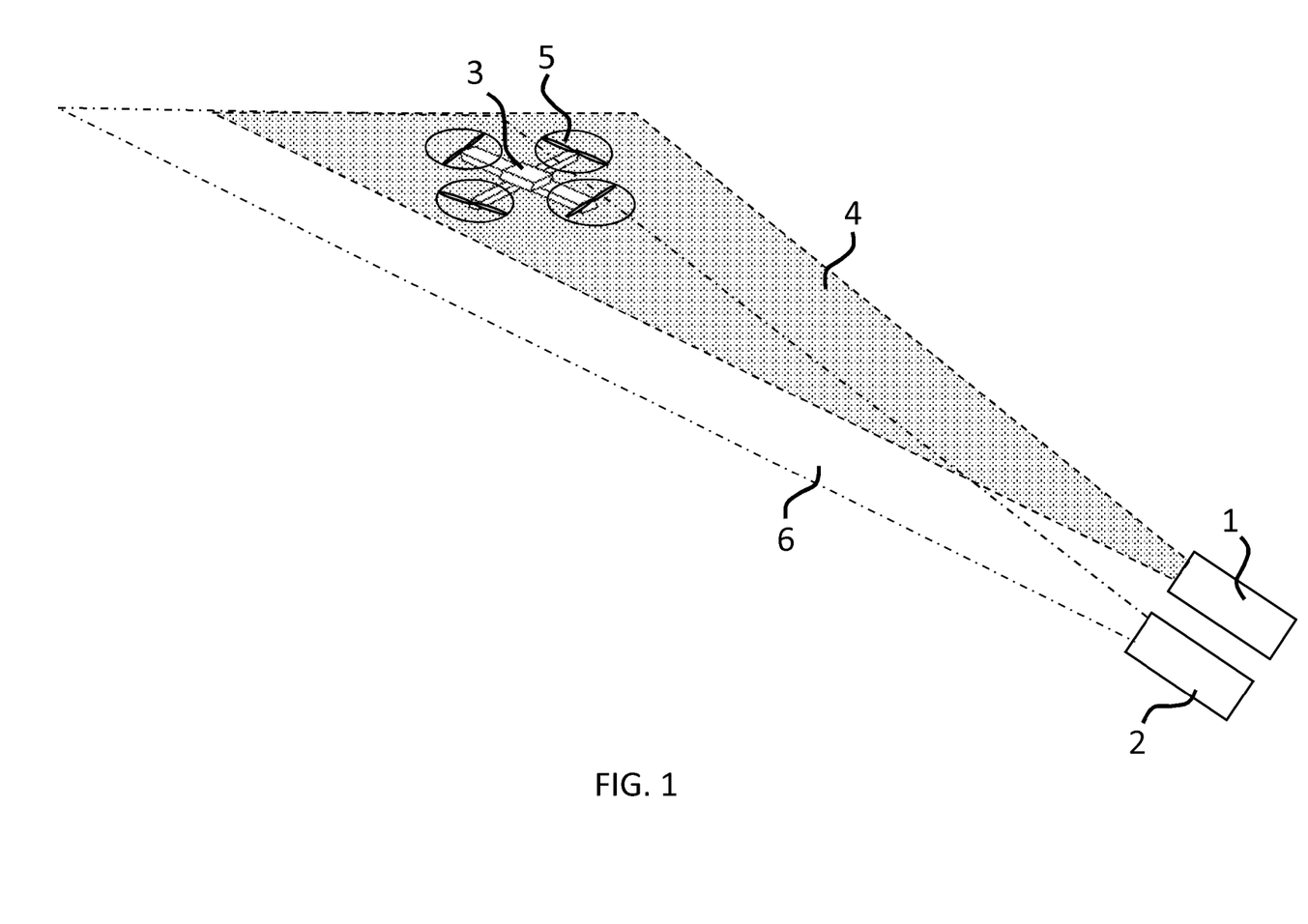
FIG. 1 shows a schematic diagram an arrangement including an illuminator and a detector according to an embodiment.

FIG. 1 shows a schematic diagram of an embodiment of the invention including an illuminator (light emitting means) 1 and an optical detector 2. The illuminator is arranged to emit light 4 to illuminate a target object, e.g., an unmanned aerial vehicle (UAV) 3 having a modulating element, e.g., one or more propellers 5. The detector 2 is arranged to receive light from the target 3 that will be modulated according to the modulation (if any) of element 5 of the target being illuminated 3 and the modulation of the light emitted by the illuminator 1. The angular range of the detector 6 shows the arc from which light can be received at the detector 2.

In FIG. 1, the illuminator 1 and optical detector 2 are shown as being co-located (adjacent to one another), but this is not essential and in some embodiments the illuminator and detector may be remote from each other. In other embodiments, the illuminator and detector may be provided integrally as part of a single device, e.g., a camera.

The optical detector 2 may be a single photodiode, a quadrant detector, an imager, image sensor, or any suitable optical detector. A lens arrangement (not shown) may also be provided in front of the detector 2 and also the illuminator 1. In the case of the detector 2 the lens arrangement would be for focussing light received from an object of interest. In the case where the optical detector 2 is a quadrant detector, such a lens arrangement can be used to de-focus the object image onto the image plane of the detector. In the case of the illuminator 1, the lens arrangement may be for focussing the illuminating light into a beam having a preferred width. In another embodiment, the illuminator may be provided with a mechanism for sweeping a beam about an arc covering a region of interest 4. The illuminator 1 may be a laser, LED, or another light source with sufficient power and directionality to illuminate the target object. The illuminator 1 may be a narrow band light source, in which case an optical filter may be included in the detector to minimise background light and hence noise.

According to an embodiment, the light emitted by the illuminator 1 is modulated at a predetermined frequency, f. The modulation scheme should preferably be a square wave pulse train such as that shown in FIG. 2. In other embodiments, pulse shapes or sinusoidal modulation format, for example, could be used instead.

Figure 2:
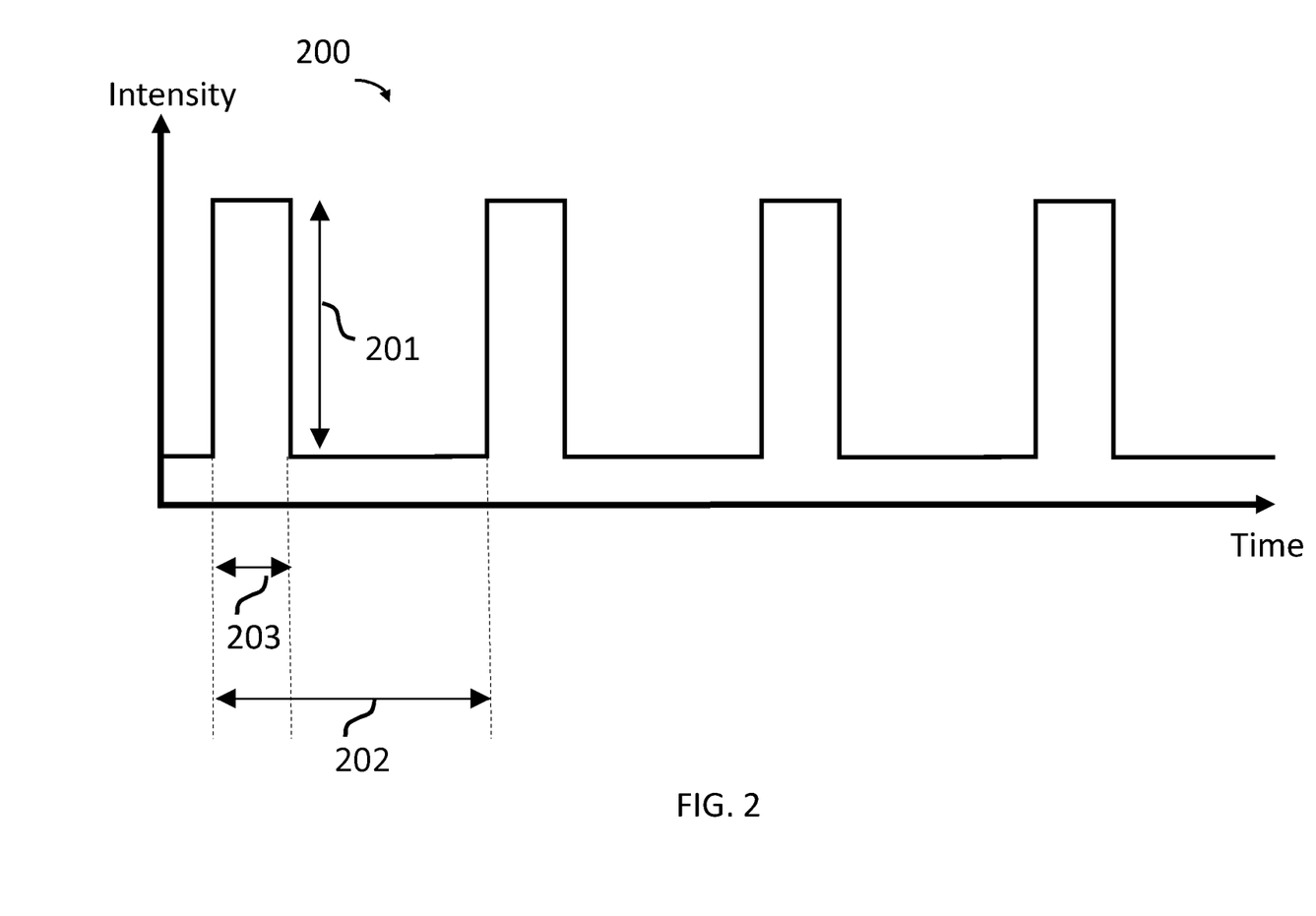
FIG. 2 shows a plot of a pulse train for modulating light from the illuminator.

The modulation of the light source is characterised by the modulation depth 201 (i.e,. the maximum to minimum intensity of the modulation), the time period 202 (which is 1/f) and the pulse width 203. The pulse width defines the mark-space ratio of the pulse train 200.

Figure 3:
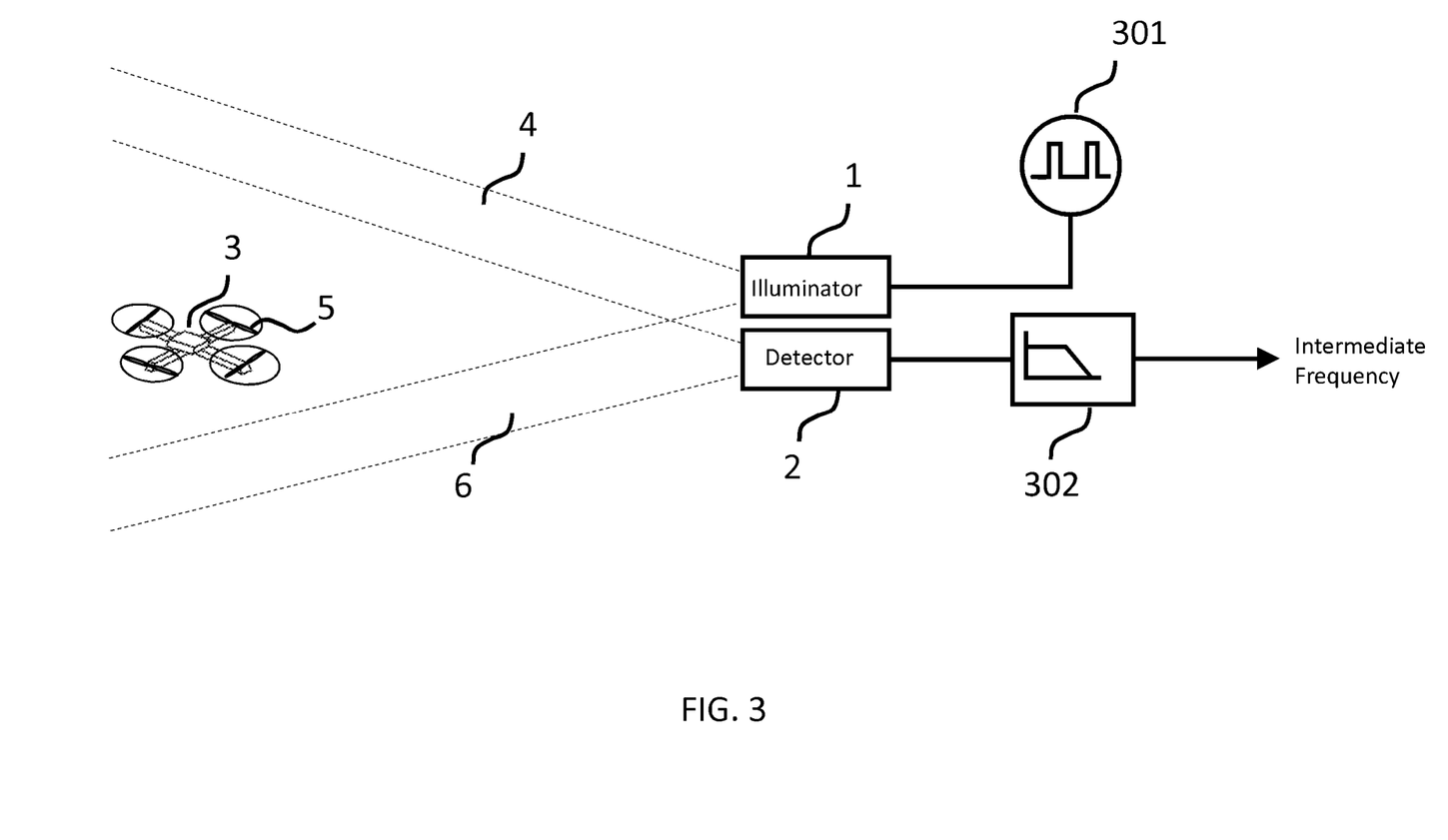
FIG. 3 shows a schematic block diagram of elements of apparatus in an embodiment of the invention.

In an embodiment, apparatus may be configured as shown in FIG. 3, such that the modulated light from the illuminator (light emitting means) 1 illuminates the target object (UAV) 3. A modulator 301 is configured to modulate the light emitted by the illuminator 1 by providing a modulation signal such as the pulse train 200 shown in FIG. 2. The illumination via the modulating light source 'beats' with the frequency of the modulating element 5 of the object 3 (in this example a UAV rotor). The detector 2 is arranged to receive the optical signal from the UAV target 3 such that the intermediate 'beat' (difference) frequency is within the bandwidth of the detector. In an embodiment, this may be ensured through the use of a low-pass filter 302 after the detector arranged to remove any residual higher frequency components and discriminate the intermediate frequency signal. In other words, the low pass filter 302 may provide better discrimination of the beating frequency in the presence of other frequency components.

Figure 4:
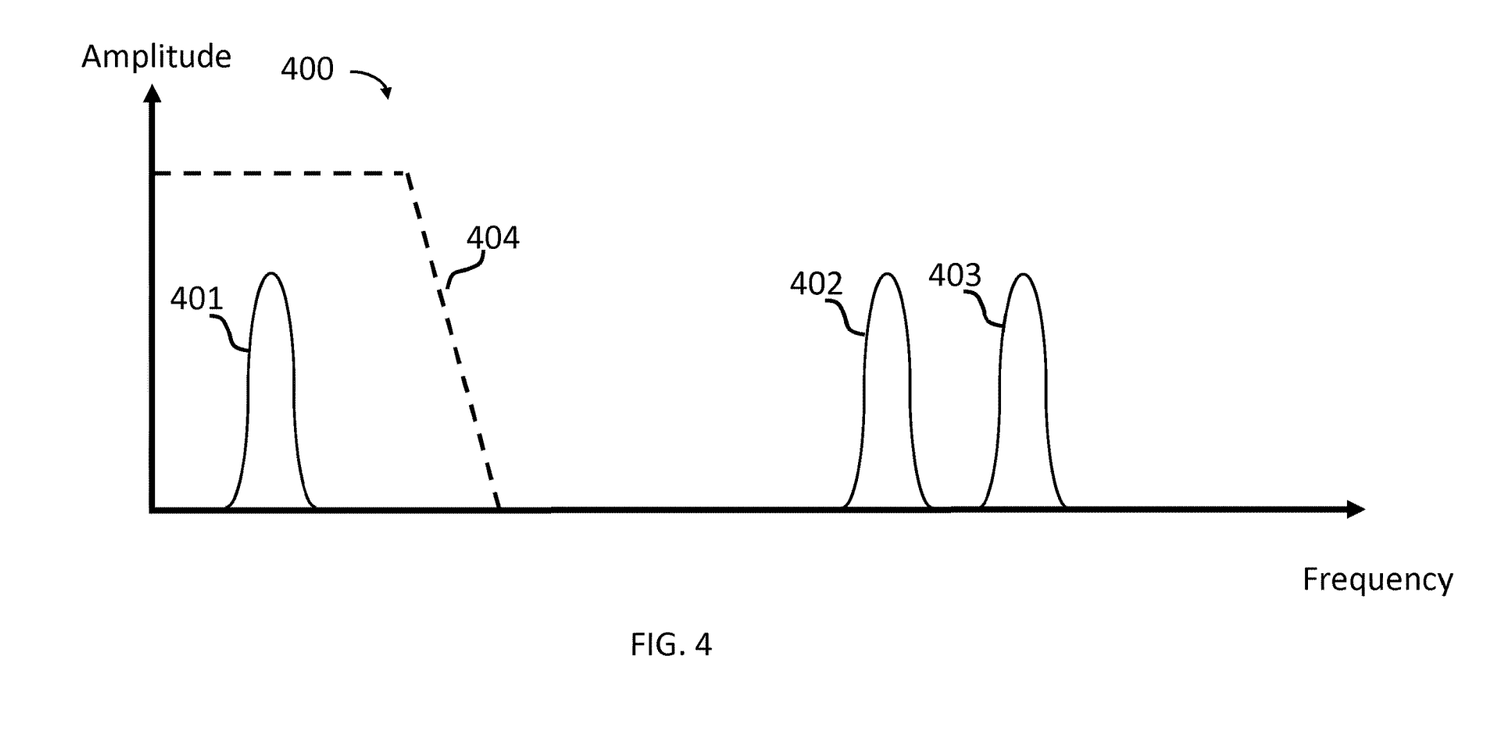
FIG. 4 is a frequency domain plot of signal amplitudes received at the detector shown the bandwidth of a low-pass filter according to an embodiment.

An example of a signal 400 received at the detector is shown in FIG. 4. The plot of FIG. 4 shows the received signal 400 in the frequency domain, such that the abscissa represents signal frequency and the ordinate axis represents signal amplitude. As can been seen the illuminator modulation frequency 402 and the object modulating frequency 403 are relatively close in the frequency spectrum which results in a low frequency intermediate frequency component 401. The intermediate frequency component 401 is within the bandwidth 404 of a low-pass filter and thus it is possible to discriminate the intermediate frequency from the illuminator and modulating element frequency components present in the signal 400.

Once the intermediate frequency signal component 401 is extracted further signal processing may be applied such as integration and thresholding to extract a signal value proportionate to the modulation depth. Such thresholding could be used to only let through signals above a certain value to avoid false positives resulting from noise or other erroneous low frequency components in the detector signal.

Figure 5:
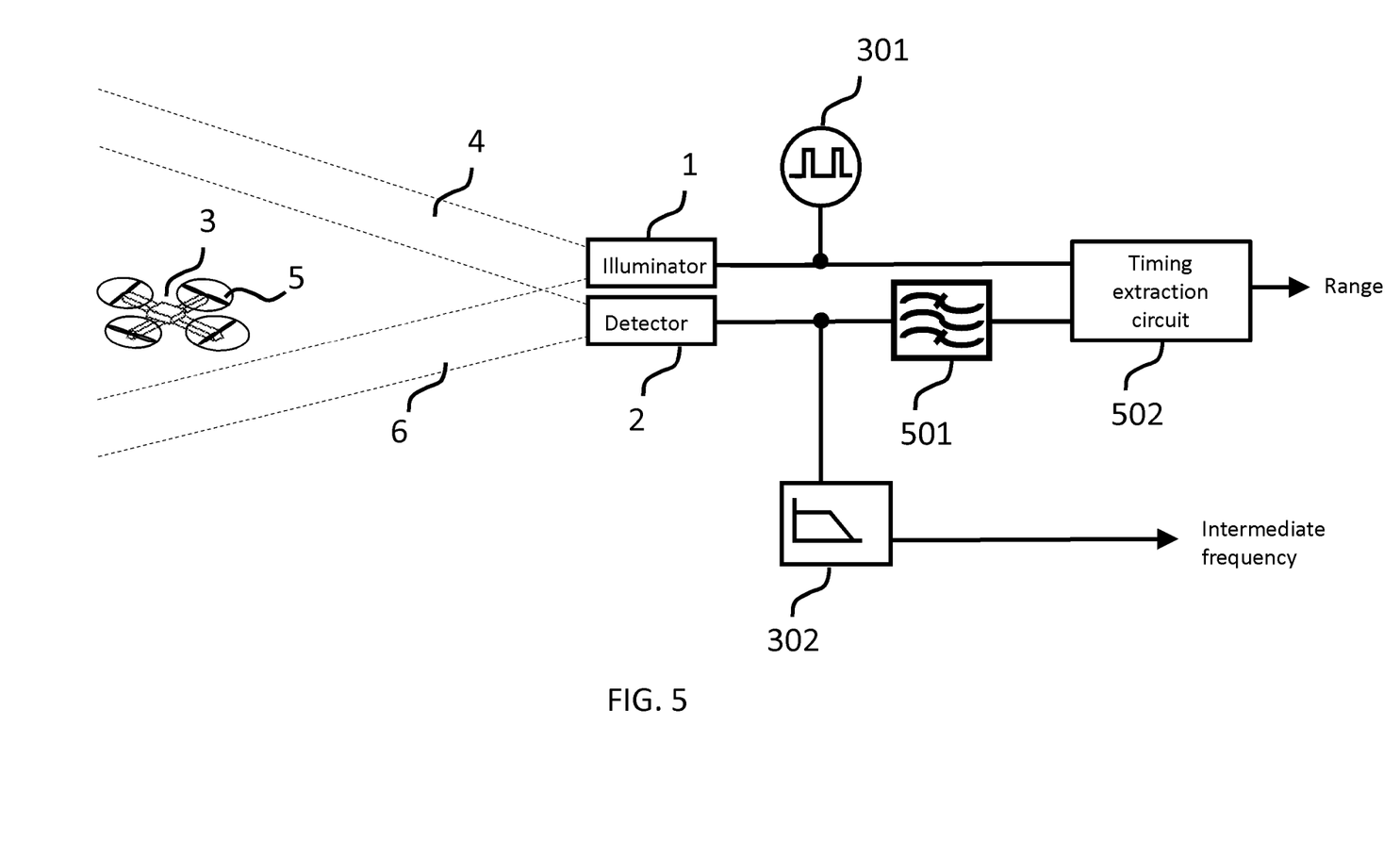
FIG. 5 is a schematic block diagram showing components of apparatus in an embodiment of the invention that includes range detection.
Figure 6:
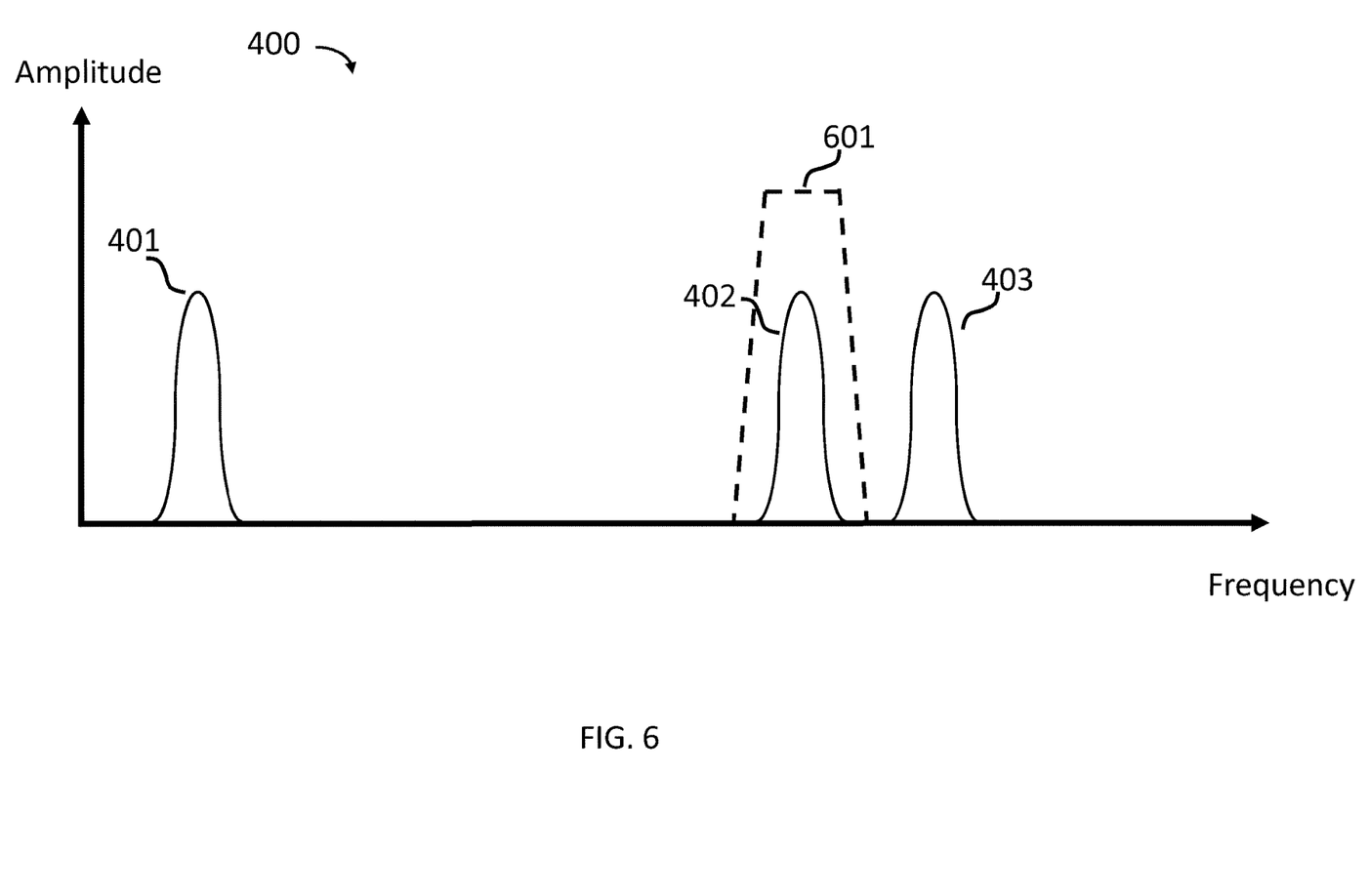
FIG. 6 is a frequency domain plot of signal amplitudes received at the detector showing the band width of a band-pass filter according to an embodiment.

In another embodiment, a timing extraction circuit 502 may also be used, as shown in FIG. 5. This is based on LIDAR principles, and its implementation in this system is relatively simple given the illumination source (the illuminator 1) is in place. The timing circuit compares the modulation pulse train, used to modulate the light emitted by the illuminator, with the received pulse train to extract the time (or phase) delay in the received pulses relative to pre-transmitted pulses. To better discriminate the component of the signal at the detector 2 having the illumination frequency a band pass filter 501 may be arranged between the detector 2 and the timing extraction circuit 502. As shown in FIG. 6 the band pass filter may be configured such that is bandwidth encompasses the modulation frequency and thus discriminates that frequency component from the received signal.

The discriminated signal having the modulation frequency 402 may then be used in the comparison with the original modulating pulse train generated by the modulator 301. The time or phase delay giving a measure of the range to the target.

This time (or phase) delay should be calibrated against any inherent latencies in the electronic components, the remaining time delay will correspond to the path of the light wave emitted by the illuminator 1 and received back at the detector 2. For a co-located illuminator 1 and detector 2 (i.e., illuminator and detector at substantially same location) the time (or phase delay) will be the time taken for the light (or light pulse) from the illuminator to travel exactly twice the distance or range to the target.

In embodiments, a band-pass filter may be used instead of the low-pass filter 302. Using such a band-pass filter may improve the signal to noise ratio and therefore help in detecting the intermediate signal of the modulating element.

In embodiments, an adaptive filter may be used instead of the low pass filter 302. For example, an adaptive band-pass filter may be used which narrows its bandwidth about the frequency of a detected intermediate frequency, thus excluding potential noise from unwanted frequencies. The frequency adapted to may further be used to aid classification of the object.

In another embodiment, the frequency of the modulation signal (e.g., pulse train) provided by the modulator 301 may be swept across a range. Accordingly, the frequency f may be swept until the intermediate (difference) frequency falls within a detectable range of the detector 2. This would be beneficial when the modulation frequency of the target is not known, for example.

In embodiments, the modulation detection may be used to track a target modulating element. For example, the optical detector 2 may be configured to provide a continuous signal. For example, where the optical detector 2 is a non-imaging sensor. Continuous detection can potentially detect modulating frequencies over a much wider bandwidth than an imaging sensor, which will be limited by effects including pixel stare time and the frame rate, for example. Position may be detected, for example, where the optical detector 2 includes multiple photo-detection sensors arranged as a quadrant detector (although other numbers of sensors may also be possible, e.g., a bi-detector). The principle of a quadrant detector is widely used as part of a feedback loop in tracking systems. In this application, the quadrants of the detector may operate continuously (as opposed to the discrete time mode of an imaging sensor). The target would be defocussed at the imaging plane of the quadrant sensor. If a propeller depending on its orientation (i.e., if viewed from the top or bottom) the rotor may need to be partially occluded in order to observe modulation. The defocussing allows the modulating signal needs to be present in all four quadrants simultaneously for accurate detection of location.

Alternatively, a type of non-imaging optical detector (sensor) called a position sensing device (also called a position sensitive device or position sensitive detector) may be used. A position sensing device is an optical position sensor that includes a semiconductor diode with North and South contacts on the top surface and East and West contacts on the bottom surface. Illumination of a portion of the diode surface may cause a change in local resistance and thus changes in electrical current flowing through the pairs of contacts. The relative electrical currents through the pairs of contacts relate to the position of illumination through the change in resistances. As will be appreciated, position sensing devices may operate isotropically and provide a continuous signal output or may be configured as a discrete sensor.

Imaging optical detectors may also be made to act in a continuous detection mode, however, if the readout circuitry was configured to include analogue modulation detection on a pixel-by-pixel basis, e.g., so only pixels meeting a threshold fired (are read out). This would allow an effectively continuous detection.

In an embodiment, the quadrant detector may be attached to a control module or other circuitry for controlling or guiding the movements of an apparatus towards (or away) from the modulating element. For example, the quadrant detector may provide signals that are used to control a mechanical steering arrangement to enable other sensors or actuators to be directed towards the modulating object. In a military environment this could be used as part of a weapon or guidance system to track and engage a target object having a modulating element. For example, to track and engage a target hostile UAV or other object.

The position detection may be used together with the timing extraction circuit 502 to provide a complete set of object tracking data including a position and range. As will be appreciated such a set of target position data is particularly useful in guidance and tracking systems, e.g., those engaging a hostile UAV or other target object.

In another embodiment, the position may be determined (and thus the object tracked) using the outputs of two or more detectors together with a suitable baseline (i.e., point of reference) to triangulate the location of the target object according to method of triangulation as known to those skilled in the art.

The modulating element may generate a modulating signal at the optical detector as a result of a change in contrast, intensity, colour, or temperature for example. In the latter case the sensor would be responsive to the thermal band.

In an embodiment, the illuminator 1 may be configured to generate short light pulses can be used to 'freeze' the motion of the rotor (or other modulating element), thereby allowing long stare times relative to the rotor frequency, to be used.

By way of explanation, if the background is dark and there is a long stare time (for example, 1 second) if a very short pulse of light (say, 1 nanosecond) is transmitted, only the motion of blur due to the rotation of the propeller (or other modulating element) in 1 nanosecond will be measured (freezing the motion).

However, the amount of signal light is the same as if the stare time was a lot shorter, provided it included the returning pulse, so it may not improve contrast. A long stare time will ensure pulses will not be missed due to unknown delay in the system, e.g., due to range though, making operation easier. A flash photo operates on the same principle, having a long shutter time to ensure it captures the light pulse.

The methods and apparatus described may be advantageous in other applications than detection of UAVs. For example, the modulating element may be the thermal emissions of a vehicle exhaust that are modulated by the engine revolutions, enabling the detection of vehicles from a modulating exhaust signature. In a further potential application, the modulating element may be the colour of a human face resulting from the heartbeat signature. Detection of the modulating element may enable face detection in cluttered scenes.

In the above description we refer to pixels when describing certain embodiments with imaging and non-imaging optical detectors but this is not intended to be limiting. Any means of optical detection may be used, e.g., a photo sensor or diode, which is capable of detecting light intensity levels and producing a measurable signal output in proportion to the amount of light detected.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The methods described herein may be realised by machine readable instructions. The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus modules of apparatus (for example, an imaging device such as an optical detector or a camera with an image sensor) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors. Such machine readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified herein.

Such machine readable instructions may also be stored in a computer readable storage that can guide the computer or other programmable data processing devices to operate in a specific mode. For example, the instructions may be provided on a non-transitory computer readable storage medium encoded with instructions, executable by a processor.

Further, the teachings herein may be implemented in the form of a computer software product, the computer software product being stored in a storage medium and comprising a plurality of instructions for making a computer device implement the methods recited in the examples of the present disclosure.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method for detecting a modulating element of an object in a scene, the method comprising:
   illuminating an element in a scene with a modulated light source;
   obtaining a signal from an optical detector based on light received from the illuminated element;
   detecting an intermediate frequency signal from the signal obtained from the optical detector, the intermediate frequency signal being related to a frequency of the modulated light source and a frequency of modulation of the element within the scene; and detecting the modulating element based on the intermediate frequency signal.

2. The method according to claim 1, wherein the intermediate frequency signal is a signal at a difference frequency between the modulated light source and the modulating element.

3. The method according to claim 2, further comprising selecting the frequency of the modulated light source so that the difference frequency lies within a preferred bandwidth.

4. The method according to claim 1, wherein detecting the intermediate frequency signal includes filtering the signal obtained from the optical detector.

5. The method according to claim 4, wherein the filtering is adaptive filtering arranged to adapt the bandwidth of the filter based on the detected intermediate frequency signal.

6. The method according to claim 4, further comprising selecting the frequency of the modulated light source so that the difference frequency lies within a preferred bandwidth, wherein the preferred bandwidth is a bandwidth of the optical detector.

7. The method according to claim 1, wherein the optical detector comprises an image sensor of a camera and the preferred bandwidth does not exceed a frame rate of the camera.

8. The method according to claim 7, further comprising selecting the frequency of the modulated light source so that the difference frequency lies within a preferred bandwidth, wherein the preferred bandwidth takes into account a frame stare time.

9. The method according to claim 8, further comprising tracking the modulating element based on the position.

10. The method according to claim 1, further comprising:
detecting a time-shifted signal having the frequency of the modulated light source from the obtained signal; and
comparing the detected time-shifted signal with the signal of the modulated light source to determine a distance from the light source to the modulating element.

11. The method according to claim 1, wherein the optical detector comprises a non-imaging optical detector which is operable to operate in a continuous detection mode.

12. The method according to claim 1, wherein detecting the modulating element includes determining a position of the modulating element based on the intermediate frequency signal.

13. The method according to claim 12, further comprising tracking the modulating element based on the position.

14. The method according to claim 1, further comprising sweeping the modulating frequency of the light source.

15. The method according to claim 14, further comprising determining a modulation frequency of the modulating element based on a frequency of the sweep at which the modulating element is detected.

16. The method according to claim 1, wherein the modulating element is one or more of: a rotor of a unmanned aerial vehicle (UAV) or other vehicle, emissions from a vehicle exhaust, and a portion of a human face.

17. An apparatus for detecting a modulating element of an object in a scene, the apparatus comprising:
a light source for illuminating an element in a scene with modulated light;
an optical detector for obtaining a signal based on light received from the illuminated element;
a signal processor for detecting an intermediate frequency signal from the signal obtained from the optical detector, the intermediate frequency signal being related to a frequency of the modulated light source and a frequency of modulation of the element within the scene; and
a modulating element detector for detecting the modulating element based on the intermediate frequency signal.

18. The apparatus according to claim 17, further comprising:
means for detecting a time-shifted signal having the frequency of the modulated light source from the obtained signal; and
means for comparing the detected time-shifted signal with the signal of the modulated light source to determine a distance from the light source to the modulating element.

19. The apparatus according to claim 17, wherein the modulating element detector is configured to determine a position of the modulating element based on the intermediate frequency signal.

20. A computer program product including one or more non-transitory machine-readable mediums encoding instructions that when executed by one or more processors cause a process to be carried out for detecting a modulating element of an object in a scene, the process comprising:
illuminating an element in a scene with a modulated light source;
obtaining a signal from an optical detector based on light received from the illuminated element;
detecting an intermediate frequency signal from the signal obtained from the optical detector, the intermediate frequency signal being related to a frequency of the modulated light source and a frequency of modulation of the element within the scene; and
detecting the modulating element based on the intermediate frequency signal.

* * * * *